United States Patent Office 3,468,970
Patented Sept. 23, 1969

3,468,970
METHOD OF CARRYING OUT TELOMERIZATION REACTIONS
Constantinos G. Screttas, Gastonia, N.C., assignor to Lithium Corporation of America, New York, N.Y., a corporation of Delaware
No Drawing. Filed Jan. 23, 1968, Ser. No. 699,767
Int. Cl. C07c 3/52, 15/04
U.S. Cl. 260—668     18 Claims

ABSTRACT OF THE DISCLOSURE

Method of carrying out production of predominately non-waxy alkyl aromatic hydrocarbons by telomerization reactions involving contacting ethylene with aromatic hydrocarbons in the presence of a catalyst in the form of solvated organolithium-active ether adducts or complexes or in the form of solvated lithium metal adducts of polyene hydrocarbons.

BACKGROUND OF THE INVENTION

The use of lithium metal per se as the active agent or catalyst in telomerization reactions and alkyllithium compounds exemplified by n- and sec-butyllithium in conjunction with certain tertiary amines as telomerization catalysts for producing alkylbenzenes is known. Lithium metal, while offering certain cost advantages, is unsatisfactory in a number of respects for carrying out telomerization reactions. Thus, apart from the fact that it is an extremely slow reaction initiator, even at relatively high temperatures of the order of 250° C., lithium metal has limitations both from the standpoint of the limited number and types of compounds that will react in its presence and the undesirable nature of the by-products it produces during reaction. Alkyllithium-tertiary amine telomerization catalysts such as those referred to hereinabove, and which are disclosed in U.S. Patent No. 3,206,519, generally speaking, have higher initiation rates than lithium metal, per se. However, cost factors, as well as other shortcomings hereafter discussed in greater detail, detract from their desirability as telomerization catalysts.

SUMMARY OF THE INVENTION

In accordance with the present invention there is provided a method of producing predominately non-waxy alkyl aromatic hydrocarbons by telomerization reactions in the presence of certain telomerizing catalysts, in the form of solvated products, including coordination complexes of organolithium compounds and active ethers, or in the form of solvated lithium metal adducts of polyene hydrocarbons, especially desirably lithium-conjugated polyene hydrocarbon adducts, which substantially overcome the aforementioned disadvantages of heretofore used agents and catalysts of the type described. Quite high catalyst efficiencies are obtained, commonly of the order of 5 moles of telomer or greater per mole of catalyst. As indicated above, the method of this invention provides a number of advantages over prior art methods. Thus, for example, lower reaction temperatures can be used in carrying out the method of this invention with the result that there is less catalyst decomposition and, therefore, longer catalyst lifetimes. Also, various of the catalyst systems utilized in the method of this invention, for instance, various of the organolithium-ether coordination complexes, are more soluble in the reaction medium than are the organolithium-tertiary amine catalyst systems at equal R-Li to ether ratios. This results in greater homogeneity of the reaction medium and allows for the use of lower reaction temperatures and the attainment of greater overall catalyst efficiency. Also, lower β-values, that is, lower transmetalation to chain propagation ratios, are attainable by the method of this invention than under various other methods under equivalent reaction conditions. These, and other advantages of the method of this invention, will become clear from the detailed description to follow.

DESCRIPTION OF THE PREFERRED EMBODIMENTS

The organolithium compounds employed in forming one group of the catalysts having utility in the practice of the method of this invention most advantageously are alkyllithium and cycloalkyllithium compounds such as ethyllithium, n-propyllithium, isopropyllithium, n-butyllithium, isobutyllithium, tert-butyllithium, n-amyllithium, isoamyllithium, n-octyllithium, isooctyllithium, and the like, particularly alkyllithiums containing from 2 to 6 carbon atoms, cyclohexyllithium and methylcyclohexyllithium. Still other types of organolithium compounds that can be used are hererocyclics such as 2-pyridyllithium and 2 - lithiophene; unsaturated organolithiums such as vinyllithium, allyllithium, crotonyllithium and propenyllithium; polylithioorganic compounds such as alkylenedilithiums or dilithiopolymethylenes, for instance, 1, 4-dilithiobutane and 1,5-dilithiopentane; and dilithioisoprene, dilithiobutadiene and dilithio adducts of other conjugated polyene hydrocarbons.

The ethers whch are useful in forming the aforesaid one group catalysts employed in the method of this invention can be represented by linear alkyl ethers such as dimethyl ether, diethyl ether, di-n-propyl ether, diisopropyl ether, di-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol, and dimethyl-, diethyl- and diisopropyl ethers of propylene glycol; cyclic alkyl ethers such as tetrahydrofuran (THF), tetrahydropyran (THP), dioxane, and 7-oxa [2,2,1]-bicycloheptane (OBH); and liquid ethers in the form of azaoxa-alkanes, aza-alkyloxacycloalkanes or oxa-alkylazacycloalkanes which can be represented by the formulae:

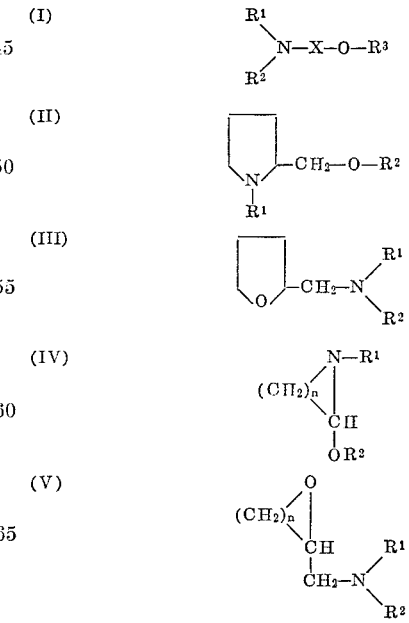

where $R^1$, $R^2$ and $R^3$ are the same or different alkyls each containing from 1 to 4 carbon atoms, namely, methyl, ethyl, n-propyl, isopropyl, n-butyl, isobutyl and t-butyl;

X is a non-reactive group such as —CH$_2$—CH$_2$—, —CH$_2$—CH$_2$—CH$_2$—,

—CH$_2$—CH—CH$_2$—
|
CH$_3$ or other divalent aliphatic hydrocarbon or alkylene radicals, preferably containing from 2 to 4 carbon atoms; and $n$ is 1 to 4. Illustrative examples of such ethers include, for instance, 2-dimethylaminoethylmethyl ether

[(CH$_3$)$_2$—N—CH$_2$—CH$_2$—O—CH$_3$]

2-diethylaminoethylmethyl ether

[(C$_2$H$_5$)$_2$—N—CH$_2$—CH$_2$—O—CH$_3$]; and 2-dimethylaminopropylmethyl ether

[(CH$_3$)$_2$—N—CH$_2$—CH$_2$—CH$_2$—O—CH$_3$]

An illustrative dioxacycloalkane is

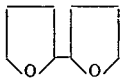

The complexes of n-butyllithium with such ethers as are represented by the aforementioned Formula I, namely,

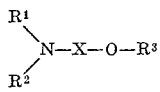

such as 2-dimethylaminoethylmethyl ether and 2-diethylaminoethylmethyl ether, and by the aforementioned Formula III are characterized by producing extremely rapid telomerization rates. Those complexes of n-butyllithium with the Formula III ethers are also characterized by the sensitivity of their β-value (β=rate of transfer/rate of propagation) to the variation of the ethylene pressure and temperature. Thus, short chain telomers in the form of alkylaromatics can be readily and economically obtained.

The proportion of the ethers to be added to the organolithium compounds employed in the telomerization reactions, utilizing said aforementioned one group of catalysts, may vary from 0.25 to 25 moles, preferably 8 to 12 moles, of ether per mole of organolithium compound. The ether, by interaction with the organolithium compound, is believed to form a coordination complex which activates the organolithium compound. The catalyst can be preformed and then added to an aromatic hydrocarbon to be reacted or it can be formed in situ by adding the catalyst components to the aromatic hydrocarbon telogen.

Another or second group of catalysts which are useful in the practice of the present invention are, as indicated above, solvated lithium metal adducts of conjugated polyenes or of vinylidene-substituted aromatic compounds, said conjugated polyenes, particularly dienes, being of straight chain or branched chain character. Exemplary of polyenes useful in the preparation of the lithium-conjugated polyene hydrocarbon adducts are isoprene, 1,3-butadiene, chloroprene, 2,3-dimethylbutadiene, 2,5-dimethyl-2,4-hexadiene, 1,3,5-hexatriene, allocimene, myrcene, 1,3,5,7-octatetraene, and the like. Of this group, lithium metal adducts of the conjugated dienes isoprene, 1,3-butadiene and 2,3-dimethylbutadiene are especially preferred. These lithium metal adducts used in the production of telomers in accordance with the present invention are prepared in the form of ether-solvated products. Ethers which are useful for this purpose can be selected from those disclosed above.

Typical of the steps involved in preparing the solvated lithium metal adducts, comprising the second group of catalysts useful in the practice of the present invention, and in the form of aromatic hydrocarbon solutions, are providing a mixture of (1) a dispersion of lithium metal in mineral oils, the particle size of the lithium metal being desirably essentially in the range of 0.01 to 0.1 mm. in diameter, (2) a liquid aromatic hydrocarbon solvent, and (3) an inert liquid ether; adding thereto, as a catalyst, a preformed or previously prepared lithium-conjugated polyene hydrocarbon adduct dissolved in an aromatic hydrocarbon solvent; gradually adding a conjugated polyene while maintaining the reaction mixture at a temperature of the order of −20° C. to −30° C.; adding an additional quantity of the aromatic hydrocarbon solvent to the reaction mixture; passing an inert gas, for instance, argon, over the reaction mixture to purge the same of the inert ether; adding an additional quantity of aromatic hydrocarbon solvent and warming the reaction mixture; and then filtering to remove unreacted lithium metal. The inert liquid ether utilized in the preparation of the said lithium-conjugated polyene hydrocarbon adducts in accordance with the procedure outlined above most advantageously is dimethyl ether or tetrahydrofuran. However, other inert ethers such as glycol dimethyl ether and diethylene glycol dimethyl ether also can be used. Among the liquid aromatic hydrocarbon solvents which can be employed in preparing these adducts are, for example, benzene, toluene and xylenes. While it is preferred to use a mineral oil dispersion of lithium metal in forming the lithium-conjugated polyene hydrocarbon adducts, other media of inert character, advantageously normally liquid paraffinic hydrocarbons, such as kerosene, isooctane, n-heptane and n-octane, can be utilized as dispersion media. The concentration of lithium metal in the reaction mixture generally will fall within the range of 0.5 to 6 gram atoms of lithium per liter of organic solvent or solvents, a particularly preferred range being from 1.5 to 4 gram atoms of lithium per liter.

Aromatic hydrocarbons which can be used as telogens in carrying out the method of the present invention include, by way of example, benzene, toluene, o-, m- and p-xylenes, naphthalene, methylnaphthalenes, mesitylene, durene, and polymethylbenzenes and polymethylpolyphenyl compounds in general; alkylbenzenes such as ethylbenzene, and isopropylbenzene and alkyl and polyalkylphenyls in general; tetralin, cyclohexylbenzene, and the like. The term "aromatic hydrocarbon," as used herein, excludes the presence of unsaturated side chains attached to the aromatic nucleus. Other aromatic hydrocarbon telogens which can be used in the practice of the present invention are disclosed, for example, in the aforementioned U.S. Patent No. 3,206,519.

In carrying out the method of the present invention, utilizing a catalyst from the above first-mentioned group, generally speaking, the organolithium compound is dissolved in an inert organic solvent, particularly a hydrocarbon solvent, and added to a solution of the ether in the aromatic hydrocarbon telogen. Various inert organic solvents can be utilized including, for instance, pentane, hexane, heptane, octane and isooctane, as well as mixtures thereof. The reaction mixture is then placed in a suitable heated reaction vessel where it is brought into contact with ethylene. In the use of such catalysts in telomerizing ethylene with aromatic hydrocarbons, the reaction temperatures utilized may range from about 20° C. to 80° C., usually from about 40° C. to 60° C. In general, the telomerization reactions are carried out under superatmospheric pressures, commonly of the order of 50 to 3,000 p.s.i.g. However, in certain cases, the telomerization reaction can be carried out at pressures only slightly above atmospheric pressure.

The telomerization reactions utilizing the foregoing catalysts systems are enhanced, promoted and augmented by the ethers. Said ethers may be added separately, or, more advantageously, in admixture with the aromatic solvent solution of the adduct. While the quantity of ether employed can be varied, the generally optimum objectives of the invention are attained with solutions comprising from about 5 to 20%, usually 10 to 15%, by volume, of the solvent used. The concentration of the adduct in the aromatic solvent solutions is variable. Generally speaking, good results can be obtained with about 0.5 N to 1.5 N, usually 1 N, solutions of the adduct. In carrying out telomerization reactions with this group of catalysts, the ethylene is reacted with the benzenoid hydrocarbon telogen by contacting the ethylene under pressure with the hydrocarbon at a temperature of the order of 20° to 120° C., more or less, and at pressures such as those referred to above.

The following specific examples are given to illustrate both the preparation of the catalyst systems and their use in carrying out telomerization reactions in accordance with the practice of this invention. It will be understood that numerous other examples will readily occur to those skilled in the art in the light of the novel guiding principles and teachings disclosed herein.

Example 1.—Preparation of benzyllithium-THF catalyst system and its use in the telomerization of ethylene using toluene as the telogen (a) 18 ml. (0.2 mole) of unsolvated sec-butyllithium was dissolved in 180 ml. of toluene, the mixture cooled to −20° C. and 40 ml. (0.4 mole) of tetrahydrofuran (THF) added slowly at −15°±1° C. When about 30 ml. of the THF had been added (15 minutes) the temperature rose to 0° C. and the entire reaction mixture solidified to a yellow crystalline mass. The remainder of the THF was added all at once and the temperature of the reaction mixture allowed to rise gradually to room temperature. Most of the solid dissolved. A further addition of 10 ml. of THF completely solubilized the solid product. After 3 hours of stirring at room temperature, oxidimetric analysis of the solution indicated a yield of benzyllithium in solution of 95%, assuming that all of the sec-butyllithium had reacted during tthis time. The solution had a residual or non-carbon lithium active content of 0.07 N and an active carbon-lithium content of 0.9 N.

(b) 20 ml. of a 0.76 N solution of benzyllithium in a toluene (85 vol. percent)—tetrahydrofuran (15 vol. percent) mixture was placed in a steel pipe autoclave. The contents of the autoclave was pressurized to 550 p.s.i. with ethylene and shaken with mechanical vibrations of relatively high frequency and low amplitude. The pressure dropped to 250 p.s.i. during a period of 16 hours. The ethylene pressure was restored to 550 p.s.i. and the autoclave heated to 50–53° C. for 2.5 hours. Heating was then discontinued and the reaction allowed to proceed at room temperature for 5 hours. Heating was resumed (80° C.) for 16 hours. During this period the pressure fell to zero. The pressure was restored for 3 hours. After cooling, the contents of the autoclave was removed (23 cc.) and treated with water. The organic layer was separated and analyzed by vapor phase chromatography (VPC). It contained 68% of telomers with alkyl side chains ranging from 2 to 21 carbon atoms; 90% of the alkylation took place in the methyl side chain, while 10% took place on the ring. About 59% of the product by (VPC) consisted of n-propylbenzene and 18% of n-amylbenzene by (VPC).

Example 2.—Telomerization of ethylene using toluene as telogen; benzyllithium-THF catalyst system 250 ml. of toluene was treated, under nitrogen, with a few cc. of benzyllithium solution to a permanent yellow color, and then transferred into a 1 liter stainless steel stirred autoclave. 50 ml. of a 0.5 N solution of benzyllithium (0.025 mole) in a 60:40 vol. percent cyclohexane-tetrahydrofuran mixture was then added to the autoclave as catalyst. Ethylene was admitted at 800 p.s.i., the temperature rising to 50° C. The temperature was kept at 50–51° C. and the reaction mixture stirred for 19 hours. The excess gas was vented. A test for active catalyst was negative. The mixture was shaken with about 10 ml. of water, filtered, and the filtrate condensed to a small volume. The precipitate, a white-waxy material, was mixed with the rest of the product. Benzene was added and the mixture subjected to distillation until the pot temperature reached 140° C. The residue weighed 28 grams and on standing set into a solid waxy material. Of this, 15.8 grams was recovered toluene and 12.2 grams was telomers. The telomer distribution was as follows (as determined by vapor phase chromatography):

$C_3$–$C_7$ side chains —29.9% (fore-cut)
$C_9$–$C_{15}$ side chains —54.3% (mid-cut)
$C_{17}$–$C_{23}$ side chains —15.8% (waxes)

Example 3.—Telomerization of tetralin with ethylene 50 ml. of a 10.9 wt. percent solution of sec-butyllithium in hexane was added slowly below 0° C. to a mixture of 5 ml. of tetralin (1,2,3,4-tetrahydronapththalene) and 10 ml. of THF. The mixture was cooled to −35° C. and then allowed to slowly attain room temperature. The reaction proceeded exothermically, the temperature rising to 50° C.

5 ml. of the orange-red product solution of the above reaction, 10 ml. of tetralin and 2 ml. of THF were placed in the pipe autoclave. The ethylene pressure was adjusted to 550 p.s.i. and heating was applied with a sun lamp. After approximately 36 hours the ethylene uptake was stopped. The reaction mixture was colorless, indicating deterioration of the catalyst. The hydrolyzed organic product was analyzed by vapor phase chromatography and showed the presence of at least 6 major alkylated tetralins with from 2 to 12 carbon atoms in the side chain.

Example 4.—Telomerization of xylene with ethylene 5 ml. (0.04 mole) of p-xylene, 1 ml. (0.01 mole) of unsolvated n-butyllithium, 20 ml. of cyclohexane, and 2.5 ml. of THF were placed in a 3-necked flask and stirred under an atmosphere of ethylene for several days. After work-up, the organic layer was analyzed by vapor phase chromatography and found to consist of one major component (besides xylene) and three smaller components. The major components was p-(n-propyl) toluene; the minor components, higher alkylated homologs.

The following are specific examples illustrating the preparation of the ether-solvated lithium-conjugatedpolyene hydrocarbons adducts.

Example 5.—Preparation of adduct of lithium metal and isoprene and its use in the telomerization of ethylene using toluene as the telogen (a) 28.5 g. of lithium metal, as a 30 wt. percent dispersion in mineral oil and having an average particle size of about 20 microns in diameter, were charged to an argon-swept reaction flask fitted with a mechanical stirrer, thermometer, addition funnel and reflux condenser. The flask was cooled to −25° C. Then, 304 g. of benzene were added to the dispersion and 755 g. of dimethyl ether were condensed into the foregoing mixture. The addition funnel was filled with 255 g. of isoprene. The temperature was maintained at −25° C. and stirring was begun. A benzene solution (0.8 N concentration) of a preformed dilithium-polyisoprene adduct was added. Then 5 g. of isoprene were rapidly added to the reaction mixture in the flask. The reaction initiated immediately as indicated by a temperature rise and the formation of a green color. The isoprene was slowly added during a one hour period. When the reaction was complete, the excess dimethyl ether was removed and additional benzene was added to obtain a product 0.9 molar in dilithium-polyisoprene adduct. The product solution was filtered to remove the unreacted lithium metal.

(b) 15 ml. of a 1 N solution of the lithium adduct of isoprene in a 90:10 volume percent mixture of toluene and tetrahydrofuran were charged to a steel pipe autoclave under argon. The autoclave was pressurized to 550 p.s.i. with ethylene. A marked decrease in ethylene pressure was observed after 1 hour. The original pressure of 550 p.s.i. of ethylene was restored to the system and the reaction allowed to continue for a period of 6 hours. The catalyst was destroyed by shaking the mixture with water. The organic layer was separated, dried with anhydrous MgSO₄ and fractionated to remove the toluene. The residue containing the telomers weighed 6.5 g. Vapor phase chromatographic analysis of this product indicated the presence of six main components corresponding to alkylbenzenes with normal side chains of 3–13 carbon atoms.

Example 6.—Preparation of adduct of lithium metal and 1,3-butadiene and its use in the telomerization of ethylene using benzene as the telogen (a) 23 g. of lithium metal as a 30 wt. percent dispersion in mineral oil were placed in a 2-liter, 3-necked round bottom flask equipped with a Dry Ice condenser (gas inlet tube at top for argon), mechanical stirrer, thermometer, and an inlet tube for butadiene. The mineral oil was removed by washing the dispersion several times with pentane. A volume of 250 ml. of benzene and about 100 ml. of dimethyl ether were placed in the flask. A 10 ml. portion of the preformed adduct of lithium metal and 1,3-butadiene in benzene solution were added to the stirred mixture to aid in initiation of the subsequent reaction with 1,3-butadiene. Liquid 1,3-butadiene (120 ml., 80 g., 1.5 moles) was added to the stirred mixture during a period of 15 minutes, the temperature of the reaction being controlled at −30° C. to −40° C. After stirring the reaction for a total of 1 hour at the above temperature, the green mixture was allowed to warm to room temperature overnight. Only a small amount of lithium metal remained unreacted on the surface of the solution and this was removed by filtration.

(b) 20 ml. of a 1 N solution of the lithium adduct of 1,3-butadiene in a 90:10 volume percent mixture of benzene and tetrahydrofuran were charged to a steel pipe autoclave under argon and the process steps of Example 5(b) above were followed. The residue containing the telomers weighed 6 g. Analysis of the product indicated the presence of six main components corresponding to alkylbenzenes with normal side chains of 3–13 carbon atoms.

Example 7.—Preparation of adduct of lithium metal and 2,3-dimethyl-1,3-butadiene (a) 12 g. of lithium metal as a 30 wt. percent dispersion in mineral oil (0.5 g. atoms of lithium containing 1 wt. percent of sodium) were reacted with 73 g. (0.9 mole) of 2,3-dimethyl-1,3-butadiene in 300 ml. of dimethyl ether. To this mixture, 200 ml. of benzene were added and the dimethyl ether was allowed to boil off overnight. Then 50 ml. of the resulting solution were stripped slowly under vacuum for 1½ hours at room temperature. Then 30 ml. of benzene were reintroduced and a filtered sample analyzed for total alkalinity and dimethyl ether content (0.82 N, 1.25% dimethyl ether). The solution was stripped again and benzene added back to yield a solution 0.83 N in base and 0.35 wt. percent dimethyl ether. Molar ratio of C-Li to dimethyl ether in the solution was 12:1.

(b) The catalyst of part (a) is used in the manner shown in Example 6(b).

What is claimed is:
1. A method of producing predominately non-waxy alkyl aromatic hydrocarbons which comprises contacting ethylene with an aromatic hydrocarbon telogen in the presence of a catalyst system selected from the following:
(a) Solvated organolithium compound—active ether coordination complexes, the mole ratio of the organolithium compound to the ether being 1 mole of the former to from about 0.25 to about 25 moles of the latter, and
(b) Solvated lithium metal adducts of polyene hydrocarbons or of vinylidine-substituted aromatic compounds, said (b) catalyst being essentially devoid of free lithium metal.

2. A method according to claim 1, wherein the aromatic hydrocarbon telogen is benzene and/or toluene.

3. A method according to claim 1, wherein the organolithium compound in the form of a solution in an inert organic solvent is added to a solution of the ether in the aromatic hydrocarbon telogen.

4. A method according to claim 3, wherein the organolithium compound is an alkyllithium.

5. A method according to claim 3, wherein the ether is a linear alkyl ether or a cyclic alkyl ether.

6. A method according to claim 2, wherein the (a) compound is a coordination complex of n-butyllithium and tetrahydrofuran.

7. A method according to claim 1, wherein the adduct comprises a lithium-conjugated polyene hydrocarbon adduct.

8. A method according to claim 7, wherein the adduct comprises a lithium adduct of isoprene.

9. A method according to claim 7, wherein the adduct comprises a lithium metal adduct of 1,3-butadiene.

10. A method according to claim 2, wherein the adduct comprises a lithium adduct of isoprene.

11. A method according to claim 2, wherein the adduct comprises a lithium adduct of 1,3-butadiene.

12. A method of producing predominately non-waxy alkyl aromatic hydrocarbons which comprises contacting ethylene with an aromatic hydrocarbon telogen and with an organolithium compound in the presence of an active ether, the mole ratio of the organolithium compound to the ether being about 1 mole of the former to from about 0.25 to 25 moles of the latter.

13. A method according to claim 1, wherein the ether is a compound corresponding to the formula.

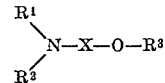

where $R^1$, $R^2$, and $R^3$ are the same or different alkyls, each containing from 1 to 4 carbon atoms, and X is a divalent aliphatic hydrocarbon radical containing from 2 to 4 carbon atoms.

14. A method according to claim 1, wherein the ether is a compound corresponding to the formula

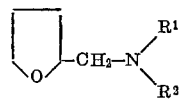

where $R^1$ and $R^2$ are the same or different alkyls, each containing from 1 to 4 carbon atoms.

15. A method according to claim 13, in which the organolithium compound is n-butyllithium, and wherein the telogen is benzene and/or toluene.

16. A method according to claim 14, in which the organolithium compound is n-butyllithium, and wherein the telogen is benzene and/or toluene.

17. A method according to claim 1, wherein the organolithium compound of (a) is an alkylenedilithium.

18. A method according to claim 17, wherein the organolithium compound is 1,4-dilithiobutane or 1,5-dilithiopentane.

References Cited
UNITED STATES PATENTS 2,548,803    4/1951    Little _____ 260—668
2,849,508    8/1958    Pines _____ 260—668

DELBERT E. GANTZ, Primary Examiner

C. R. DAVIS, Assistant Examiner

U.S. Cl. X.R.

260—671